（12） United States Patent
Gattupalli et al.

(10) Patent No.: US 9,328,295 B2
(45) Date of Patent: May 3, 2016

(54) EXTRACT RECYCLE IN A HYDROCARBON DECONTAMINATION PROCESS

(71) Applicant: UOP LLC, Des Plaines, IL (US)

(72) Inventors: Rajeswar R. Gattupalli, Arlington Heights, IL (US); Beckay J. Mezza, Arlington Heights, IL (US); Alakananda Bhattacharyya, Glen Ellyn, IL (US); Carl J. Stevens, Lake Forest, IL (US); Joao Jorge da Silva Ferreira Alves, Arlington Heights, IL (US); Massimo Sangalli, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 322 days.

(21) Appl. No.: 14/039,003

(22) Filed: Sep. 27, 2013

(65) Prior Publication Data

US 2015/0090638 A1   Apr. 2, 2015

(51) Int. Cl.
*C10G 21/28* (2006.01)
*B01D 11/04* (2006.01)
*C10G 21/06* (2006.01)

(52) U.S. Cl.
CPC .............. *C10G 21/28* (2013.01); *B01D 11/04* (2013.01); *B01D 11/0426* (2013.01); *B01D 11/0446* (2013.01); *C10G 21/06* (2013.01); *C10G 2300/201* (2013.01); *C10G 2300/4056* (2013.01); *C10G 2300/4081* (2013.01)

(58) Field of Classification Search
CPC .............. C10G 21/28; B01D 11/0446; B01D 11/0426; B01D 11/04
See application file for complete search history.

(56) References Cited

U.S. PATENT DOCUMENTS

| | | | |
|---|---|---|---|
| 2,948,676 A | * | 8/1960 | Hutson, Jr. ......... B01D 11/0426 196/132 |
| 7,198,712 B2 | | 4/2007 | Olivier-Bourbigou et al. |
| 7,553,406 B2 | | 6/2009 | Wasserscheid et al. |
| 8,127,938 B2 | | 3/2012 | Myers et al. |
| 8,821,716 B2 | * | 9/2014 | Victorovna Likhanova ........... C07D 233/58 208/208 R |
| 2010/0243532 A1 | * | 9/2010 | Myers ................ B01D 11/0446 208/254 R |
| 2010/0270211 A1 | | 10/2010 | Wolny |
| 2011/0155635 A1 | | 6/2011 | Serban et al. |
| 2011/0155637 A1 | | 6/2011 | Serban et al. |
| 2011/0155638 A1 | | 6/2011 | Bhattacharyya et al. |
| 2011/0155644 A1 | | 6/2011 | Bhattacharyya et al. |
| 2011/0155645 A1 | | 6/2011 | Serban et al. |
| 2012/0024756 A1 | | 2/2012 | Verma et al. |

* cited by examiner

*Primary Examiner* — Randy Boyer
*Assistant Examiner* — Juan Valencia

(57) ABSTRACT

Recycle of an extract stream containing a contaminant is used to improve recovery of hydrocarbons in a contaminant removal process. At least a portion of an extract stream is recycled to a contaminant extraction zone and contacted with rich ionic liquid. Contaminants in the recycle extract stream are transferred to the rich ionic liquid.

10 Claims, 1 Drawing Sheet

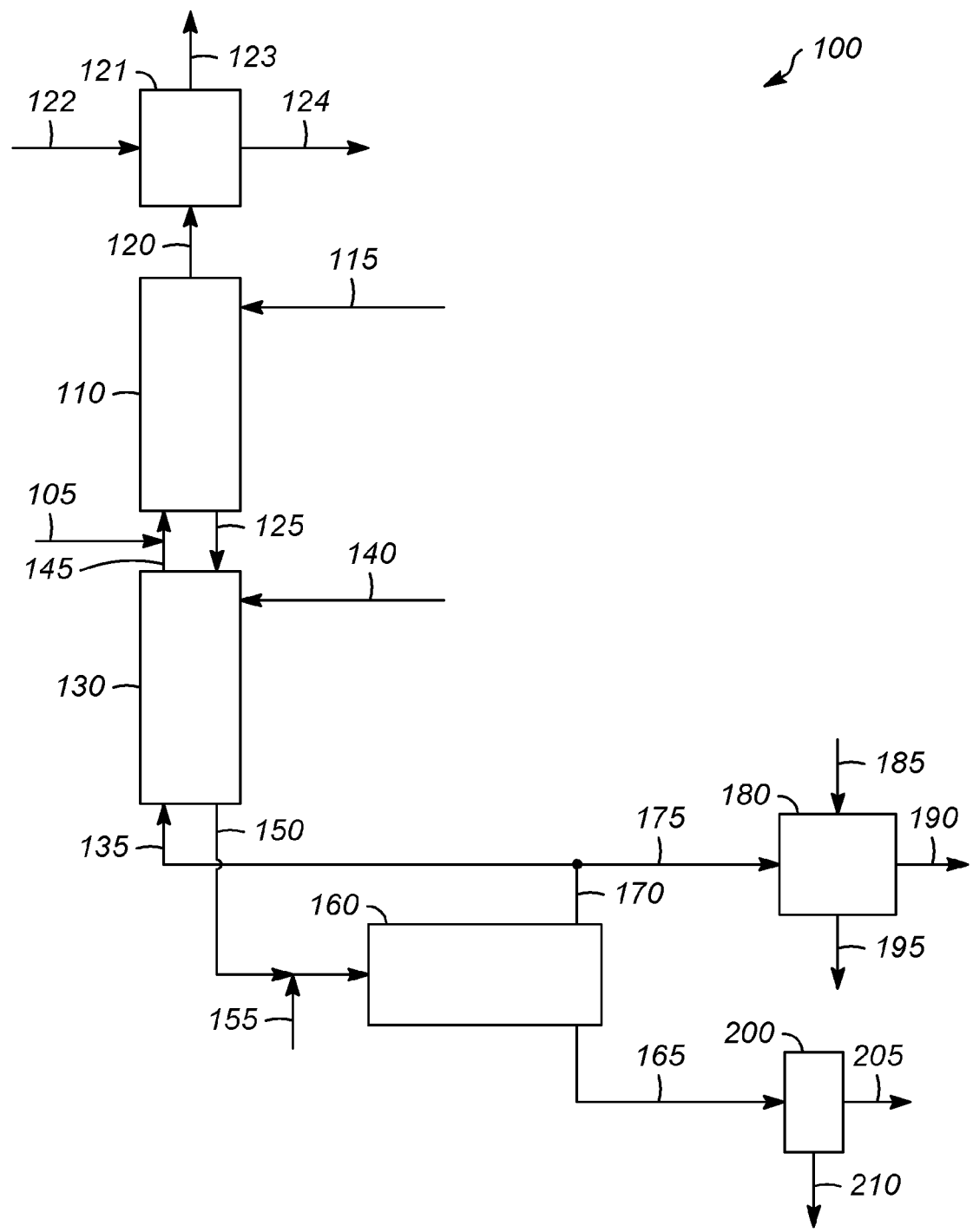

EXTRACT RECYCLE IN A HYDROCARBON DECONTAMINATION PROCESS

BACKGROUND OF THE INVENTION

Some hydrocarbon feeds can be converted into higher value hydrocarbon fractions such as diesel fuel, jet fuel, naphtha, gasoline, and other lower boiling fractions in refining processes such as hydrocracking and fluid catalytic cracking (FCC). However, hydrocarbon feed streams having higher amounts of contaminants, such as sulfur and nitrogen, are more difficult to convert to higher value fractions. The degree of conversion, product yields, catalyst deactivation, and/or ability to meet product quality specifications may be adversely affected by the sulfur or nitrogen content of the feed stream.

Therefore, various processes have been developed to remove contaminants from hydrocarbon feeds. It is known to reduce the sulfur content of hydrocarbon streams by catalytic hydrogenation reactions such as in a hydrotreating process unit. While the hydrotreating process increases conversion, the hydrotreating process units are very expensive and require substantial amounts of hydrogen.

There remains a need in the art for processes for removing contaminants from hydrocarbon feeds.

SUMMARY OF THE INVENTION

One aspect of the invention is a method of regenerating a rich ionic liquid stream containing a contaminant. In one embodiment, the method includes contacting the rich ionic liquid stream with a recycle extract stream containing the contaminant in a contaminant extraction zone to transfer at least a portion of the contaminant in the recycle extract stream to the rich ionic liquid stream, wherein the ionic liquid is immiscible in a hydrocarbon. The effluent from the contaminant extraction zone is separated into a lean ionic liquid stream and an extract stream containing the contaminant, wherein at least a portion of the extract stream containing the contaminant comprises the recycle extract stream.

Another aspect of the invention is a method of decontaminating a hydrocarbon feed containing a contaminant. In one embodiment, the method includes contacting an ionic liquid with the hydrocarbon feed in a feed extraction zone to transfer the contaminant from the hydrocarbon feed to the ionic liquid to form a decontaminated hydrocarbon stream and a rich ionic liquid stream, wherein the ionic liquid is immiscible in a hydrocarbon. The rich ionic liquid stream is contacted with a recycle extract stream containing the contaminant in a contaminant extraction zone to transfer at least a portion of the contaminant in the recycle extract stream to the rich ionic liquid. The effluent from the contaminant extraction zone is separated into a lean ionic liquid stream and an extract stream containing the contaminant, wherein at least a portion of the extract stream containing the contaminant comprises the recycle extract stream. The decontaminated hydrocarbon stream is recovered.

BRIEF DESCRIPTION OF THE DRAWING

The FIGURE is an illustration of one embodiment of a hydrocarbon decontamination process utilizing extract recycle.

DETAILED DESCRIPTION OF THE INVENTION

The invention relates to processes for removing contaminants from hydrocarbon streams using ionic liquids. When a hydrocarbon stream containing contaminants is treated with ionic liquid, the ionic liquid removes the hydrocarbon molecule containing the contaminant, which reduces the hydrocarbon feed stream. Because the feed stream is sent to a reactor, it is desirable to minimize the loss of hydrocarbon feed in the decontamination process.

The present invention utilizes recycle of an extract stream to improve recovery of the hydrocarbon in an ionic liquid removal process. A rich ionic liquid stream from a contamination extraction zone is separated into a lean ionic liquid stream and an extract stream containing the contaminant. At least a portion of the extract stream is recycled to the contaminant extraction zone and contacted with the rich ionic liquid. Contaminants in the recycle stream are transferred to the rich ionic liquid, improving hydrocarbon recovery.

The extract recycle is typically a part of hydrocarbon decontamination process in which a hydrocarbon feed is contacted with an ionic liquid which is immiscible in the hydrocarbon. The contaminants in the hydrocarbon feed are transferred to the ionic liquid, which is then contacted with the recycle extract stream.

The hydrocarbon feed can be any suitable hydrocarbon which contains contaminants which need to be removed. Suitable hydrocarbon feeds include, but are not limited to, vacuum gas oil, diesel, jet fuel, coker gas oil, heavy coker gas oil, light cycle oil, vacuum residue, naphtha, gasoline, distillate, or combinations thereof.

The terms "vacuum gas oil", "VGO", "VGO phase" and similar terms relating to vacuum gas oil as used herein are to be interpreted broadly to receive not only their ordinary meanings as used by those skilled in the art of producing and converting such hydrocarbon fractions, but also in a broad manner to account for the application of our processes to hydrocarbon fractions exhibiting VGO-like characteristics. Thus, the terms encompass straight run VGO as may be produced in a crude fractionation section of an oil refinery, as well as, VGO product cuts, fractions, or streams that may be produced, for example, by coker, deasphalting, and visbreaking processing units, or which may be produced by blending various hydrocarbons.

In general, VGO comprises petroleum hydrocarbon components boiling in the range of from about 100° C. to about 720° C. In an embodiment, the VGO boils from about 250° C. to about 650° C. and has a density in the range of from about 0.80 g/cm$^3$ to about 1.2 g/cm$^3$. In another embodiment, the VGO boils from about 95° C. to about 580° C.; and in a further embodiment, the VGO boils from about 300° C. to about 720° C.

The term "coker gas oil" means the hydrocarbon material boiling in the range between about 260° C. and about 600° C. atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The term "heavy coker gas oil" means the hydrocarbon material boiling in the range between about 300° C. and about 620° C. atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The term "light cycle oil" means the hydrocarbon material boiling in the range between about 205° C. and about 400° C.

atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The term "vacuum residue" means the hydrocarbon material boiling of at least about 510° C. atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The term "diesel" means the hydrocarbon material boiling in the range between about 150° C. and about 370° C. atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The term "naphtha" means the hydrocarbon material boiling in the range between about 10° C. and about 200° C. atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The term "gasoline" means the hydrocarbon material boiling in the range between about 10° C. (80° F.) and about 185° C. atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The term "distillate" means the hydrocarbon material boiling in the range between about 150° C. and about 420° C. atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The term "jet fuel" means the hydrocarbon material boiling in the range between about 120° C. and about 300° C. atmospheric equivalent boiling point (AEBP) as determined by any standard gas chromatographic simulated distillation method such as ASTM D2887, all of which are used by the petroleum industry. The hydrocarbon material may be more contaminated and contain a greater amount of aromatic compounds than is typically found in refinery products.

The ionic liquid can remove one or more of the contaminants in the hydrocarbon feed. The term "contaminant" means one or more species found in the hydrocarbon material that is detrimental to further processing. Contaminants include, but are not limited to, nitrogen, sulfur, metals (e.g., nickel, iron, and vanadium) and Conradson carbon residue or carbon residue. The metals content of such components, for example, may be in the range of 100 ppm to 2,000 ppm by weight, the total sulfur content may range from 0.1 to 7 wt %, the nitrogen content may be from about 100 ppm to 30,000 ppm, and the API gravity may range from about −5° to about 35°. The Conradson carbon residue of such components is generally less than 30 wt %.

The nitrogen content may be determined using ASTM method D4629-02, Trace Nitrogen in Liquid Petroleum Hydrocarbons by Syringe/Inlet Oxidative Combustion and Chemiluminescence Detection. The sulfur content may be determined using ASTM method D5453-00, Ultraviolet Fluorescence; and the metals content may be determined by UOP389-09, Trace Metals in Oils by Wet Ashing and ICP-OES. The Conradson carbon residue may be determined by ASTM D4530. Unless otherwise noted, the analytical methods used herein such as ASTM D5453-00 and UOP389-09 are available from ASTM International, 100 Barr Harbor Drive, West Conshohocken, Pa., USA.

The hydrocarbon feed will usually comprise a plurality of nitrogen compounds of different types in various amounts. Thus, at least a portion of at least one type of nitrogen compound may be removed from the hydrocarbon feed. The same or different amounts of each type of nitrogen compound can be removed, and some types of nitrogen compounds may not be removed. In an embodiment, the nitrogen content of the vacuum gas oil is reduced by at least about 20 wt %, or at least about 30 wt %, or at least 40 wt %, or at least about 50 wt %, or at least about 60 wt %, or at least about 70 wt %, or at least 80 wt %.

The hydrocarbon feed will typically also comprise a plurality of sulfur compounds of different types in various amounts. Thus, at least a portion of at least one type of sulfur compound may be removed from the hydrocarbon feed. The same or different amounts of each type of sulfur compound may be removed, and some types of sulfur compounds may not be removed. In an embodiment, the sulfur content of the hydrocarbon feed is reduced by at least 3 wt %, at least about 15 wt %, or at least 20 wt %, or at least about 30 wt %, or at least about 40 wt %, or at least about 50 wt %, or at least about 60 wt %, or at least about 70 wt %, or at least 80 wt %.

The hydrocarbon feed will usually contain various metals, including, but not limited to, nickel, iron, and vanadium. In an embodiment, the metal content of the hydrocarbon feed can be reduced by at least about 10% on an elemental basis, or at least about 20 wt %, or at least about 25 wt %, or at least about 30 wt %, or at least about 40 wt %, or at least about 50%. In some embodiments, at least about 15% of the nickel and vanadium are removed from the hydrocarbon feed on a combined weight basis, or at least about 25% of the nickel and vanadium from the hydrocarbon feed on a combined weight basis. For example, 40% of the nickel and vanadium can be removed from the hydrocarbon feed on a combined weight basis if the hydrocarbon feed contains 80 ppm-wt nickel and 120 ppm-wt vanadium and the hydrocarbon feed effluent contains 20 ppm-wt nickel and 100 ppm-wt vanadium. The metal removed may be part of a hydrocarbon molecule or complexed with a hydrocarbon molecule.

One embodiment of a hydrocarbon decontamination process 100 is illustrated in the FIGURE. A hydrocarbon feed 105 containing one or more contaminants is introduced into the feed extraction zone 110 where it contacts a lean hydrocarbon feed-immiscible ionic liquid stream 115. The contaminants are transferred from the hydrocarbon feed 105 to the lean hydrocarbon feed-immiscible ionic liquid stream 115. The decontaminated hydrocarbon stream 120 exiting the feed extraction zone 110 has a lower level of contaminants than the hydrocarbon feed 105.

The feed extraction zone can comprise a contacting zone and a separating zone. In the contacting zone, the hydrocarbon feed comprising the contaminant(s) and the hydrocarbon feed-immiscible ionic liquid are contacted or mixed. The contacting may facilitate transfer of one or more contaminants from the hydrocarbon feed to the ionic liquid. Although a hydrocarbon feed-immiscible ionic liquid that is partially soluble in the hydrocarbon feed may facilitate transfer or extraction of the contaminants from the hydrocarbon feed to the ionic liquid, partial solubility is not required. Insoluble hydrocarbon feed/ionic liquid mixtures may have sufficient interfacial surface area between the hydrocarbon feed and ionic liquid to be useful. In the separation zone, the mixture of hydrocarbon feed and ionic liquid containing the contaminant settles or forms two phases: a decontaminated hydrocarbon feed phase and an ionic liquid phase containing the contaminants. The two phases are then separated to produce a hydrocarbon feed-immiscible ionic liquid effluent containing the contaminants and a decontaminated hydrocarbon feed effluent.

Any suitable extraction processes and equipment can be used. In some embodiments, the feed extraction zone 110 comprises countercurrent extraction with one or more stages. In other embodiments, the feed extraction zone 110 is a continuous extraction column.

Consistent with common terms of art, the ionic liquid introduced to the feed extraction zone may be referred to as a "lean ionic liquid" generally meaning a hydrocarbon feed-immiscible ionic liquid that is not saturated with one or more extracted contaminants. Lean ionic liquid may include one or both of fresh and regenerated ionic liquid and is suitable for accepting or extracting contaminants from the hydrocarbon feed. Likewise, the ionic liquid effluent may be referred to as "rich ionic liquid", which generally means a hydrocarbon feed-immiscible ionic liquid effluent produced by a contaminant removal step or process or otherwise including a greater amount of extracted contaminants than the amount of extracted contaminants included in the lean ionic liquid. A rich ionic liquid may require regeneration or dilution, e.g. with fresh ionic liquid, before recycling the rich ionic liquid to the same or another contaminant removal step of the process.

Generally, ionic liquids are non-aqueous, organic salts composed of ions where the positive ion is charge balanced with a negative ion. These materials have low melting points, often below 100° C., undetectable vapor pressure, and good chemical and thermal stability. The cationic charge of the salt is localized over hetero atoms, such as nitrogen, phosphorous, sulfur, arsenic, boron, antimony, and aluminum, and the anions may be any inorganic, organic, or organometallic species.

Ionic liquids suitable for use in the instant invention are hydrocarbon feed-immiscible ionic liquids. As used herein the term "hydrocarbon feed-immiscible ionic liquid" means the ionic liquid is capable of forming a separate phase from hydrocarbon feed under the operating conditions of the process. Ionic liquids that are miscible with hydrocarbon feed at the process conditions will be completely soluble with the hydrocarbon feed; therefore, no phase separation will be feasible. Thus, hydrocarbon feed-immiscible ionic liquids may be insoluble with or partially soluble with the hydrocarbon feed under the operating conditions. An ionic liquid capable of forming a separate phase from the hydrocarbon feed under the operating conditions is considered to be hydrocarbon feed-immiscible. Ionic liquids according to the invention may be insoluble, partially soluble, or completely soluble (miscible) with water.

In an embodiment, the hydrocarbon feed-immiscible ionic liquid comprises at least one of an imidazolium ionic liquid, a pyridinium ionic liquid, and a phosphonium ionic liquid. In another embodiment, the hydrocarbon feed-immiscible ionic liquid consists essentially of imidazolium ionic liquids, pyridinium ionic liquids, phosphonium ionic liquids and combinations thereof. In still another embodiment, the hydrocarbon feed-immiscible ionic liquid is selected from the group consisting of imidazolium ionic liquids, pyridinium ionic liquids, phosphonium ionic liquids and combinations thereof. Imidazolium and pyridinium ionic liquids have a cation comprising at least one nitrogen atom. Phosphonium ionic liquids have a cation comprising at least one phosphorous atom.

The ionic liquid comprises at least one ionic liquid from at least one of the following ionic liquids: tetraalkylphosphonium dialkylphosphates, tetraalkylphosphonium dialkyl phosphinates, tetraalkylphosphonium phosphates, tetraalkylphosphonium tosylates, tetraalkylphosphonium sulfates, tetraalkylphosphonium sulfonates, tetraalkylphosphonium carbonates, tetraalkylphosphonium metalates, oxometalates, tetraalkylphosphonium mixed metalates, tetraalkylphosphonium polyoxometalates, and tetraalkylphosphonium halides.

In an embodiment, the hydrocarbon feed-immiscible ionic liquid comprises at least one of 1-ethyl-3-methylimidazolium ethyl sulfate, 1-butyl-3-methylimidazolium hydrogen sulfate, 1-ethyl-3-methylimidazolium chloride, 1-butyl-3-methylimidazolium chloride, 1-butyl-3-methylimidazolium trifluoromethanesulfonate, 1-butyl-4-methylpyridinium chloride, N-butyl-3-methylpyridinium methylsulfate, trihexyl(tetradecyl)phosphonium chloride, trihexyl(tetradecyl) phosphonium bromide, tributyl(methyl)phosphonium bromide, tributyl(methyl)phosphonium chloride, tributyl(hexyl) phosphonium bromide, tributyl(hexyl)phosphonium chloride, tributyl(octyl)phosphonium bromide, tributyl(octyl)phosphonium chloride, tributyl(decyl)phosphonium bromide, tributyl(decyl)phosphonium chloride, tetrabutylphosphonium bromide, tetrabutylphosphonium chloride, triisobutyl(methyl)phosphonium tosylate, tributyl(ethyl) phosphonium diethylphosphate, tetrabutylphosphonium methanesulfonate, pyridinium p-toluene sulfonate.

The hydrocarbon feed-immiscible ionic liquid may comprise at least one of 1-butyl-3-methylimidazolium trifluoromethanesulfonate, 1-butyl-4-methylpyridinium chloride, N-butyl-3-methylpyridinium methylsulfate, trihexyl(tetradecyl)phosphonium chloride, trihexyl(tetradecyl)phosphonium bromide, tributyl(hexyl)phosphonium chloride, tributyl(octyl)phosphonium chloride, tetrabutylphosphonium chloride, and tributyl(ethyl)phosphonium diethylphosphate.

The decontaminated hydrocarbon stream 120 is sent to the hydrocarbon feed water washing zone 121 to recover ionic liquid that is entrained or otherwise remains in the decontaminated hydrocarbon feed stream 120 by using water to wash or extract the ionic liquid from the decontaminated hydrocarbon feed stream 120. In some embodiments, a portion or all of the decontaminated hydrocarbon stream 120 and a water stream 122 (as solvent) are introduced to hydrocarbon feed washing zone 121. The decontaminated hydrocarbon stream 120 and water stream 122 are mixed and separated to produce a washed hydrocarbon stream 123 and a spent water stream 124, which comprises the ionic liquid. The hydrocarbon feed washing may be conducted in a similar manner and with similar equipment as used to conduct other liquid-liquid wash and extraction operations. Various hydrocarbon feed washing equipment and conditions such as temperature, pressure, times, and solvent to feed ratio may be the same as or different from the feed extraction zone equipment and conditions. In general, the hydrocarbon feed washing conditions will fall within the same ranges as given below for the hydrocarbon feed extraction and/or contaminant extraction conditions. A portion or all of the washed hydrocarbon stream 123 may be passed to one or more hydrocarbon conversion zones (not shown) for further processing.

The rich ionic liquid stream 125 is sent from the feed extraction zone 110 to a contaminant extraction zone 130 where it contacts a recycle extract stream 135. Contaminants are transferred from the recycle extract stream 135 to the rich ionic liquid stream 125.

An optional solvent stream 140 can be introduced into the contaminant extraction zone 130. The optional solvent stream 140 comprises an ionic liquid-miscible, hydrocarbon feed-immiscible solvent. Suitable ionic-liquid-miscible hydrocarbon-feed-immiscible solvents include, but are not limited to, water, methanol, or combinations thereof. The optional solvent stream 140 helps to create a density difference between the hydrocarbon and the ionic liquid which aids separation.

The contaminant extraction zone can comprise a contacting zone and a separating zone, as discussed above with respect to the feed extraction zone. In the contacting zone, the recycle extract stream comprising the contaminant(s) and the rich ionic liquid are contacted or mixed. The contacting may facilitate transfer of one or more contaminants from the recycle extract stream to the rich ionic liquid. In the separation zone, the mixture of recycle extract stream and rich ionic liquid settles or forms two phases: a decontaminated hydrocarbon extract phase and an ionic liquid phase containing the contaminants. The two phases are then separated to produce a hydrocarbon feed-immiscible ionic liquid effluent containing the contaminants and a hydrocarbon extract stream with a lower level of contaminants than the recycle extract stream.

Any suitable extraction processes and equipment can be used. In some embodiments, the contaminant extraction zone 130 comprises a countercurrent extraction with one or more stages. In other embodiments, the contaminant extraction zone 130 is a continuous extraction column.

A hydrocarbon extract stream 145 with a lower level of contaminants than the recycle extract stream 135 exits the contaminant extraction zone 130, is mixed with the hydrocarbon feed 105, and is sent to the feed extraction zone 110.

The rich ionic liquid stream 150 exits the contaminant extraction zone 130. Water 155 is added to the rich ionic liquid stream 150. The mixture is separated in a separation zone 160 into an ionic liquid and water stream 165 and an extract stream 170. The separation zone can include one or more mixer/settler units, continuous contacting column, or combinations thereof.

The extract stream 170 contains hydrocarbons with contaminants and can be divided into the extract recycle stream 135 and a second portion 175. By sending the extract recycle stream 135 back to the contaminant extraction zone 130, additional contaminants can be removed from the hydrocarbon extract.

The second portion 175 of the extract stream 170 is sent to the extract water washing zone 180 to recover ionic liquid that is entrained or otherwise remains in the second portion 175 by using water to wash or extract the ionic liquid from the second portion 175. In some embodiments, a portion of the second portion 175 of the extract stream 170 and a water stream 185 (as solvent) are introduced to extract washing zone 180. The second portion 175 and water stream 185 are mixed and separated to produce a washed extract stream 190 and a spent water stream 195, which comprises the ionic liquid. The extract washing may be conducted in a similar manner and with similar equipment as used to conduct other liquid-liquid wash and extraction operations. Various extract washing equipment and conditions such as temperature, pressure, times, and solvent to feed ratio may be the same as or different from the hydrocarbon feed extraction and contaminant extraction zone equipment and conditions. In general, the extract washing conditions will fall within the same ranges as given below for the hydrocarbon feed extraction and contaminant extraction conditions. A portion or all of the washed extract stream 190 may be passed to one or more extract treatment zones (not shown) for further processing of the contaminants.

The ionic liquid and water stream 165 can be sent to a drying zone 200 to remove the water 210 from the ionic liquid 205. Suitable drying processes include, but are not limited to, evaporation, distillation, flash distillation, or combinations thereof. One example of a suitable drying process is a multi-stage evaporator. The dried ionic liquid stream 205 can be recycled to the feed extractor 110 as the hydrocarbon feed-immiscible ionic liquid stream 115, if desired.

The hydrocarbon feed extraction and/or contaminant extraction steps may be conducted under extraction conditions including temperatures and pressures sufficient to keep the hydrocarbon feed-immiscible ionic liquid and various hydrocarbon feeds and effluents as liquids. For example, the hydrocarbon feed extraction and/or contaminant extraction step temperature may range between about 10° C. and less than the decomposition temperature of the ionic liquid; and the pressure may range between about atmospheric pressure and about 700 kPa(g). When the hydrocarbon feed-immiscible ionic liquid comprises more than one ionic liquid component, the decomposition temperature of the ionic liquid is the lowest temperature at which any of the ionic liquid components decompose. The contaminant removal step may be conducted at a uniform temperature and pressure or the contacting and separating steps of the contaminant removal step may be operated at different temperatures and/or pressures. In an embodiment, the contacting step is conducted at a first temperature, and the separating step is conducted at a temperature at least 5° C. lower than the first temperature. In a non limiting example, the first temperature is about 80° C. Such temperature differences may facilitate separation of the hydrocarbon feed and ionic liquid phases.

The above and other hydrocarbon feed extraction and contaminant extraction conditions, such as the contacting or mixing time, the separation or settling time, and the ratio of hydrocarbon feed to hydrocarbon feed-immiscible ionic liquid (lean ionic liquid), may vary greatly based, for example, on the specific ionic liquid or liquids employed, the nature of the hydrocarbon feed (straight run or previously processed), the type(s) and amount(s) of the contaminants in the hydrocarbon feed, the degree of contaminant removal required, the number of hydrocarbon feed extraction and contaminant extraction steps employed, and the specific equipment used. In general, it is expected that contacting time may range from less than one minute to about two hours; settling time may range from about one minute to about eight hours; and the weight ratio of contaminated hydrocarbon feed to lean ionic liquid introduced to the contaminant removal step may range from 1:10,000 to 10,000:1. In an embodiment, the weight ratio of contaminated hydrocarbon feed to lean ionic liquid may range from about 1:1,000 to about 1,000:1; and the weight ratio of contaminated hydrocarbon feed to lean ionic liquid may range from about 1:100 to about 100:1. In an embodiment, the weight of contaminated hydrocarbon feed is greater than the weight of ionic liquid introduced to the contaminant removal step.

As discussed herein, multiple hydrocarbon feed extraction and contaminant extraction steps can be used to provide the desired amount of contaminant removal. The degree of phase separation between the hydrocarbon feed and ionic liquid phases is another factor to consider as it affects recovery of the ionic liquid and decontaminated hydrocarbon feed. The degree of contaminant removed and the recovery of the decontaminated hydrocarbon feed and ionic liquids may be affected differently by the nature of the hydrocarbon feed, the type and amount of contaminants, the specific ionic liquid or liquids, the equipment, and the contaminant removal conditions such as those discussed above.

The amount of water present in the hydrocarbon feed/hydrocarbon feed-immiscible ionic liquid mixture during the contaminant removal step may also affect the amount of contaminant removed and/or the degree of phase separation, i.e., the recovery of the hydrocarbon feed and ionic liquid. In some embodiments, the hydrocarbon feed/hydrocarbon feed-immiscible ionic liquid mixture has a water content of less than about 10% relative to the weight of the ionic liquid, or less than about 5%, or less than about 2%. In other embodiments, the hydrocarbon feed/hydrocarbon feed-immiscible ionic liquid mixture is water free, i.e. the mixture does not contain water.

The process may be practiced in laboratory scale experiments through full scale commercial operations. The process may be operated in batch, continuous, or semi-continuous mode. Individual process steps may be operated continuously and/or intermittently as needed for a given embodiment, e.g., based on the quantities and properties of the streams to be processed in such steps.

The process encompasses a variety of flow scheme embodiments including optional destinations of streams, splitting streams to send the same composition, i.e., aliquot portions, to more than one destination, and recycling various streams within the process.

Unless otherwise stated, the exact connection point of various inlet and effluent streams within the zones is not essential to the invention. For example, it is well known in the art that a stream to a distillation zone may be sent directly to the column, or the stream may first be sent to other equipment within the zone such as heat exchangers, to adjust temperature, and/or pumps to adjust the pressure. Likewise, streams entering and leaving the zones may pass through ancillary equipment such as heat exchangers within the zones. Streams, including recycle streams, introduced to the various zones may be introduced individually or combined prior to or within such zones.

For example, in a small scale form of the invention, the decontamination can be accomplished by mixing the hydrocarbon feed and a hydrocarbon feed-immiscible ionic liquid in a beaker, flask, or other vessel, e.g., by stirring, shaking, use of a mixer, or a magnetic stirrer. When the mixing or agitation is stopped, the mixture will form a hydrocarbon feed phase and an ionic liquid phase which can be separated, for example, by decanting, centrifugation, or use of a pipette to produce a decontaminated hydrocarbon feed effluent having a lower level of contaminants compared to the incoming hydrocarbon feed. The decontaminated feed can then be poured into a laboratory sized batch reactor, for example.

As used herein, the term "zone" can refer to one or more equipment items and/or one or more sub-zones. Equipment items may include, for example, one or more vessels, heaters, separators, exchangers, conduits, pumps, compressors, and controllers. Additionally, an equipment item can further include one or more zones or sub-zones. The hydrocarbon feed extraction and/or contaminant extraction process or step may be conducted in a similar manner and with similar equipment as is used to conduct other liquid-liquid wash and extraction operations. Suitable equipment includes, for example, columns with: trays, packing, rotating discs or plates, and static mixers. Pulse columns and mixing/settling tanks may also be used.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of regenerating a rich ionic liquid stream, the rich ionic liquid stream containing a contaminant, the method comprising:
    contacting the rich ionic liquid stream with a recycle extract stream containing the contaminant in a contaminant extraction zone to transfer at least a portion of the contaminant in the recycle extract stream to the rich ionic liquid stream, wherein the ionic liquid is immiscible in a hydrocarbon;
    separating an effluent from the contaminant extraction zone into a lean ionic liquid stream and an extract stream containing the contaminant, wherein at least a portion of the extract stream containing the contaminant comprises the recycle extract stream;
    adding a solvent to the contaminant extraction zone, wherein the solvent is miscible in the ionic liquid and immiscible in the hydrocarbon, and wherein the effluent from the contaminant extraction zone further comprises the solvent;
    wherein the lean ionic liquid stream further comprises the solvent; and
    removing the solvent from the lean ionic liquid stream.

2. The method of claim 1 wherein the contacting zone is a column, or an extractor.

3. The method of claim 1 wherein contacting the rich ionic liquid with the recycle extract stream containing the contaminant is continuous.

4. The method of claim 1 further comprising:
    contacting an ionic liquid with a hydrocarbon feed containing the contaminant in a feed extraction zone to transfer the contaminant from the hydrocarbon feed to the ionic liquid to form a decontaminated hydrocarbon stream and the rich ionic liquid stream; and
    recovering the decontaminated hydrocarbon stream.

5. The method of claim 4 wherein the hydrocarbon feed containing the contaminant is vacuum gas oil, diesel, jet fuel, coker gas oil, heavy coker gas oil, light cycle oil, vacuum residue, naphtha, gasoline, distillate, or combinations thereof.

6. The method of claim 1 wherein the contaminant is nitrogen, sulfur, metals, carbon residue, or combinations thereof.

7. A method of decontaminating a hydrocarbon feed containing a contaminant comprising:
    contacting an ionic liquid with the hydrocarbon feed in a feed extraction zone to transfer the contaminant from the hydrocarbon feed to the ionic liquid to form a decontaminated hydrocarbon stream and a rich ionic liquid stream, wherein the ionic liquid is immiscible in a hydrocarbon;
    contacting the rich ionic liquid stream with a recycle extract stream containing the contaminant in a contaminant extraction zone to transfer at least a portion of the contaminant in the recycle extract stream to the rich ionic liquid;

separating an effluent from the contaminant extraction zone into a lean ionic liquid stream and an extract stream containing the contaminant, wherein at least a portion of the extract stream containing the contaminant comprises the recycle extract stream; and recovering the decontaminated hydrocarbon stream and further comprising:

adding a solvent to the contaminant extraction zone, wherein the effluent from the contaminant extraction zone further comprises the solvent wherein the solvent is miscible in the ionic liquid and immiscible in the hydrocarbon;

wherein the lean ionic liquid stream further comprises the solvent; and removing the solvent from the lean ionic liquid stream.

8. The method of claim 7 wherein the hydrocarbon feed is vacuum gas oil, diesel, jet fuel, coker gas oil, heavy coker gas oil, light cycle oil, vacuum residue, naphtha, gasoline, distillate, or combinations thereof.

9. The method of claim 7 wherein the contaminant is nitrogen, sulfur, metals, carbon residue, or combinations thereof.

10. The method of claim 7 wherein contacting the rich ionic liquid with the recycle extract stream containing the contaminant is continuous.

* * * * *